United States Patent [19]

Bounds

[11] 4,267,575
[45] May 12, 1981

[54] WHEEL SPEED SIGNAL-PRODUCING SYSTEM FOR SKID CONTROL

[75] Inventor: Peter Bounds, Simi Valley, Calif.

[73] Assignee: The Bendix Corporation, North Hollywood, Calif.

[21] Appl. No.: 55,730

[22] Filed: Jul. 9, 1979

[51] Int. Cl.³ .............................................. G01P 3/48
[52] U.S. Cl. ................................ 364/565; 364/426; 235/92 FQ; 361/240; 303/95
[58] Field of Search ................ 364/426, 565; 361/238, 361/240; 244/111; 303/95, 109; 235/92 FQ, 92 CP, 92 TF

[56] References Cited

U.S. PATENT DOCUMENTS

| | | | |
|---|---|---|---|
| 3,757,167 | 9/1973 | Yoshikawa et al. | 361/240 |
| 3,892,952 | 7/1975 | Shibata et al. | 303/95 |
| 4,056,287 | 11/1977 | Gudat | 364/426 |
| 4,056,778 | 11/1977 | Randazzo | 235/92 FQ |
| 4,125,295 | 11/1978 | Ruhnau et al. | 303/95 |
| 4,166,976 | 9/1979 | Ruhnau et al. | 364/565 |

OTHER PUBLICATIONS

IBM Technical Disclosure Bulletin–"Computer and Apparatus For Measuring Rotational Speed", by S. Bederman, vol. 13, No. 4, Sep. 1970, pp. 1017–1018.

*Primary Examiner*—Charles E. Atkinson
*Assistant Examiner*—Gary Chin
*Attorney, Agent, or Firm*—Robert C. Smith; William F. Thornton

[57] ABSTRACT

A system for providing signals to a microprocesser-based control from which instantaneous values of speed can be computed includes a wheel-driven alternator which provides an alternating current output whose frequency varies with wheel speed. A signal processor converts this signal to a series of sensor pulses whose width varies inversely with frequency. A sample pulse is supplied from the microprocessor which sets the period or length of time the sensor pulses are examined for each speed calculation of the microprocessor. The sample period pulses are AND gated with a high rate clock and also with the sensor pulses to provide a series of marker pulses marking the up and down excursions of the sensor pulses. The marker pulses occurring in each sample period are counted directly in a first counter, are supplied to a latch circuit, and from thence to an AND gate which responds to the occurrence of the first marker pulse in the sample period to connect the high rate clock pulses to a second counter for the remainder of the sample period, and to a third counter where the marker pulses act to reset the count to zero. The third counter is also connected to receive the high rate clock pulses so that it counts only the clock pulses occurring after the last marker pulse in the sample period. At the end of the sample period, the counts from all three counters are transferred to the microprocessor which uses this information to compute a value for wheel (or tire) velocity over the sample period. The system continues to provide the input counts to enable the microprocessor to calculate wheel (tire) velocity for each sample period.

6 Claims, 3 Drawing Figures

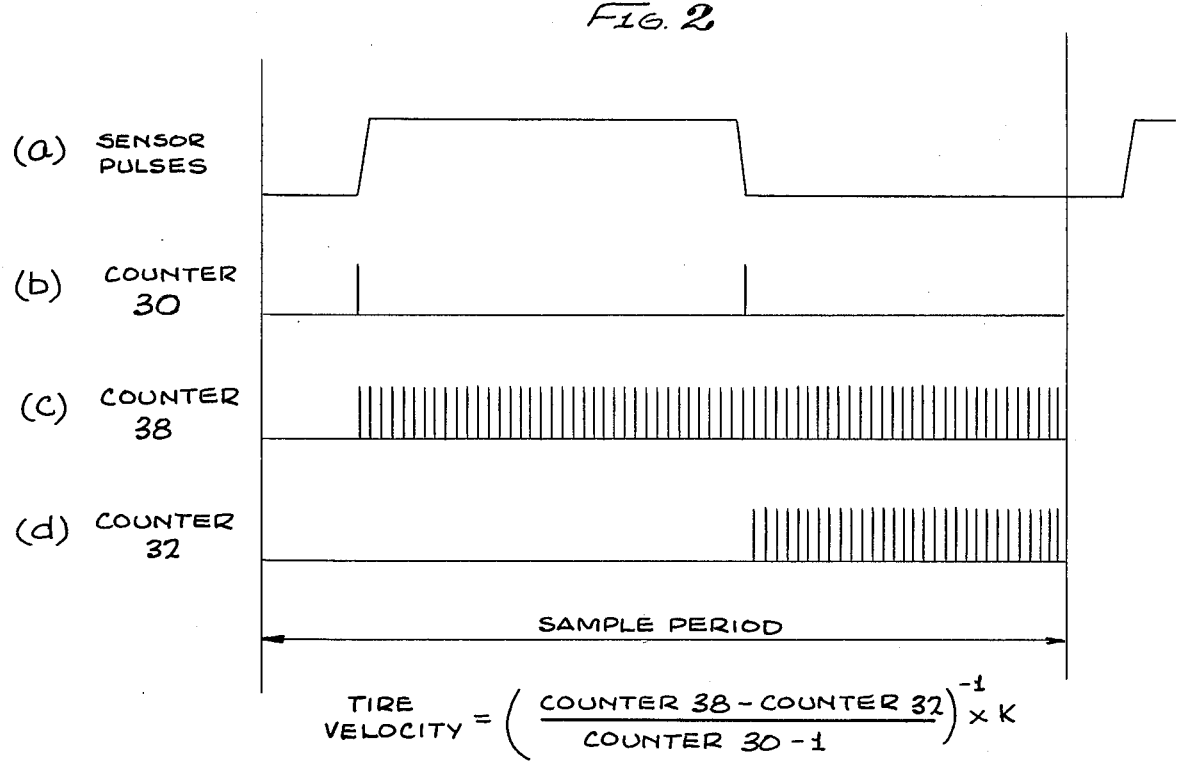
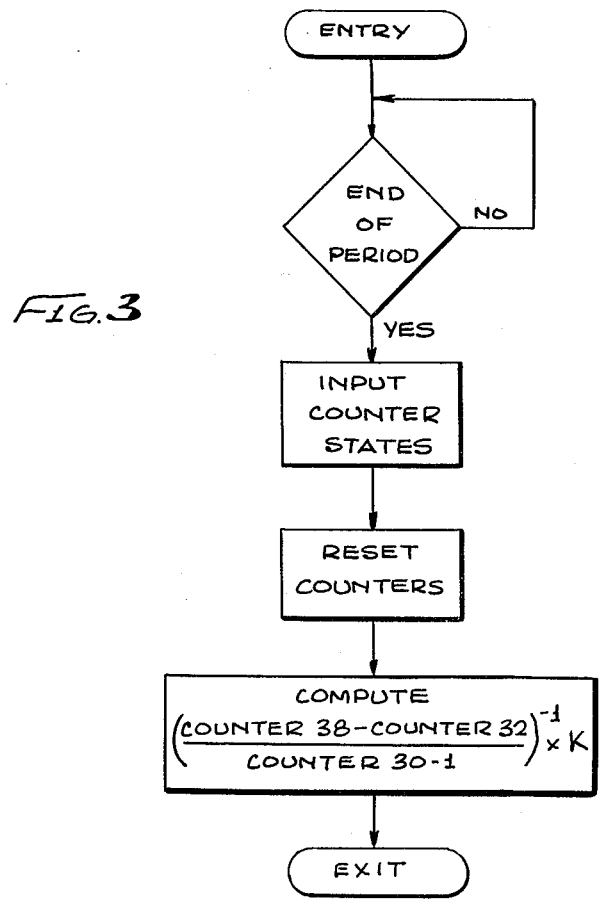

WHEEL SPEED SIGNAL-PRODUCING SYSTEM FOR SKID CONTROL

BACKGROUND OF THE INVENTION

As skid control systems for aircraft have become progressively faster and more sophisticated, they have evolved toward the use of digital computing techniques for solving certain required equations. In view of the many variables experienced in terms of surface condition, weather conditions, etc., and in view of the fast computing capabilities available, it becomes more and more important that the wheel or tire speed-responsive means have good resolution and fast response time. Prior art systems have relied upon wheel speed signal generators which are really wheel-driven alternators having a substantial number of poles so that an alternating current signal is generated whose instantaneous frequency is proportional to instantaneous speed of the wheel. Since wheel speed generators should be as small and light as possible, there is, of course, a practical limit as to the number of poles, hence cycles per wheel revolution, which can be built into such an alternator.

The braked wheel can, however, change its operating characteristics from an acceptable deceleration to an unacceptable skid in a relatively few degrees of rotation, which may mean that even with as many as 128 poles, the number of signal cycles available at the time of a skid to produce a meaningful input signal may be so few that the associated control system may not respond quickly. During this time the skidding may well either continue or get worse before any correction can take place. Thus the wheel speed sensor has come to be recognized as imposing a significant limiting factor preventing substantial improvement in the performance of skid controls.

DESCRIPTION OF THE DRAWINGS

FIG. 2 (comprised of a-d) is a graph showing a number of wave forms produced and used by the system of FIG. 1;

FIG. 3 is a flow chart indicating a manner in which the output of FIG. 1 may be used in a microprocessor-based skid control system.

DESCRIPTION OF THE PREFERRED EMBODIMENT

Figure 1:
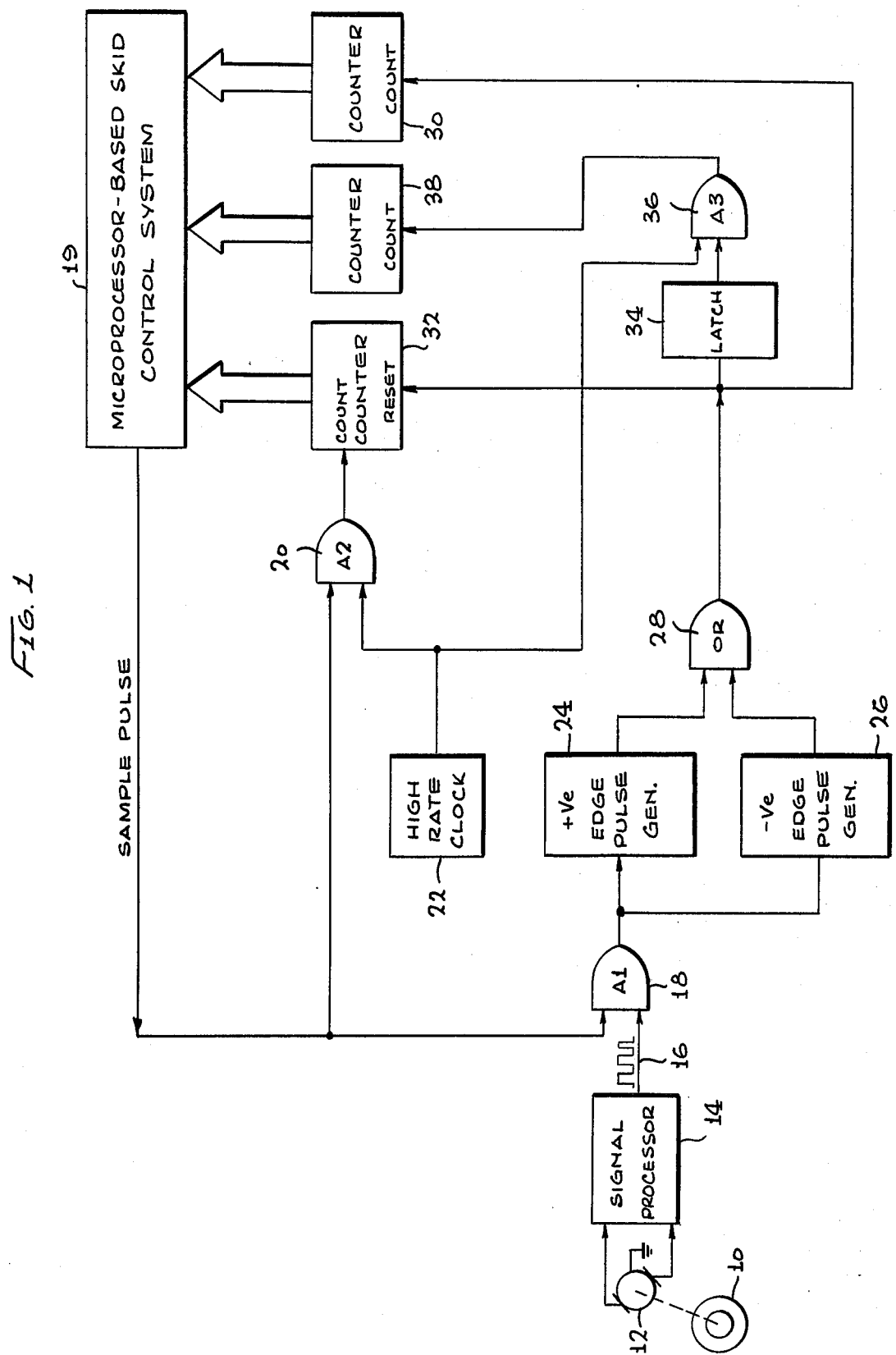
FIG. 1 is a schematic block diagram of a wheel-speed sensor according to the present invention shown in association with a skid control system.

FIG. 1 is a schematic block diagram of a wheel speed-sensing system incorporating my invention. Referring to FIG. 1, the aircraft wheel being controlled is shown at numeral 10. It is connected through a mechanical link to an alternator 12 having a large number of poles which produces an alternating current output whose frequency varies with rotational speed of said alternator. The output of the alternator 12 is supplied to a signal processor 14 where it is converted to a series of sensor pulses whose width varies with the frequency of said alternator. These sensor pulses are shown diagrammatically on a line 16 connected between processor 14 and the input of an AND gate 18. Gate 18 is also connected to receive the output of sample pulses from the microprocessor-based skid control system 19. The wheel-speed calculating system computes rotational velocity providing to a computer or microprocessor a plurality of numerical factors from which the microprocessor can compute a number representing wheel speed averaged over a sample period. This number or numerical representation of wheel (or tire) speed must be the virtual instantaneous value for correct skid control computation. This requires a sample value of wheel speed over a desired period. The lower limit of tire speed for which anti-skid is required determines the sample period of the sensor signal. This is given by:

(1) Sample Period $= 2/v \times n$ where $v =$ lower limit of tire speed for which skid control is required in radians/sec.

and $n =$ number of pulses per revolution of the speed sensor.

With programmed inputs as to v and n, any appropriate microprocessor can readily provide the desired sample pulse. Sample pulses from control system 19 are also connected at one input of a second AND gate 20 which also receive pulses from a high rate clock 22. Each of AND gates 18 and 20 thus provides outputs only during the period of a sample pulse, gate 18 providing sensor pulses only during the sample period and gate 20 providing high rate clock pulses at its output only during the sample period. These outputs are shown graphically in FIG. 2 wherein time is depicted horizontally and the sample period is represented by the two widely spaced vertical lines. Sample sensor pulses appear on the top line (Graph (a)) in their relative time relationship to the sample pulse. The sensor pulses supplied by AND gate 18 are received in a pair of edge pulse generators 24 and 26 with generator 24 responding to positive-going excursions of the sensor pulses to produce sharp marker pulses and generator 26 responding to negative-going excursions of the sensor pulses to also produce sharp marker pulses. Both sets of pulses from edge pulse generators 24 and 26 are supplied as input signals to an OR gate 28 which passes these marker pulses to a counter 30 which counts the number of marker pulses occurring during the sample pulse period, to a counter 32 where it is used to reset the counter to its initial state, and to a latch circuit 34 which changes state upon incidence of the first sensor pulse edge occurring during the sample period. With this change of state, the high rate clock pulses are gated via an AND gate 36 into a counter 38. At the end of the sample period, counter 38 has counted the number of clock pulses occurring from incidence of the first sensor pulse edge (the first marker pulse) within the sample period until the end of the sample period, as shown in graph (c) of FIG. 2.

Graph (b) of FIG. 2 shows the output pulses from OR gate 28 which occur within the sample period. The sample pulse is also supplied to AND gate 20 along with the clock pulses from clock 22 which transfers these clock pulses to counter 32 which counts the number of clock pulses occurring in the sample period. Since counter 32 is reset to zero each time the sensor pulse changes state within the sample period, the action of counter 32 is to provide a count of the number of clock pulses occurring between the last sensor pulse change of state (marker pulse) and the end of the sample time period. This is shown in FIG. 2, graph (d).

At the end of the sample period, all counters cease their counting and maintain their current state. The counters connect to a data bus in the microprocessor-based skid control system 19 where their counts are transferred at the end of each sample period. In the control system the computer (microprocessor) calculates tire velocity using the equation:

(2) Tire Velocity =

$$\left(\frac{\text{counter 38} - \text{counter 32}}{\text{counter 30} - 1}\right)^{-1} \times K$$

where K =

$$\frac{\text{radians per sensor pulse}}{2 \times \text{high rate clock pulse period}}$$

It will be recognized that the factor "radians per sensor pulse" is built into the alternator 12 and the "high rate clock pulse" is the output of clock 22.

After transfer of data from counters to the microprocessor 19, the counters and latch are reset and a new sample period commences. During this sample period the computer works out the anti-skid control equations and provides an output that is used to control the anti-skid servo valve (or other output device). The computer then waits until the new sample period finishes and then repeats the calculation for a new number for controlling the servo valve.

FIG. 3 is a computer flow chart which shows the type of sequencing that takes place to make a calculation of tire speed. The numerical representation of value attained by each counter at the end of a real time period is first transferred sequentially over a common bus line into the computer. These numbers are next substituted into the above equation (2) which is then solved, giving the tire speed.

It will be recognized that the particular microprocessor-based skid control system used bears no relationship to the present invention other than as a means of utilizing the counts supplied by the counters 30, 32 and 38 and that these counter inputs provide a means whereby any appropriate microprocessor may solve the above equation for wheel or tire velocity. It will be apparent to those skilled in the art that modifications may be made within the scope of the present invention.

I claim:

1. In a skid control system for a vehicle having at least one wheel including a brake on said wheel and brake-actuating means, operator-operated means for operating said actuating means, a control element for overriding said operator-operated means, and an electronic control system including a microprocessor having means generating a series of uniform sample pulses and means producing a signal in response to decelerations in excess of a desired value for operating said control element, said deceleration-responsive means including means generating a digital signal responsive to rotational speed of said wheel:

characterized in that said rotational wheel speed signal-generating means comprises sensor means including signal-processing means generating a series of pulses whose frequency varies with the rotational speed of said wheel, a digital clock producing clock pulses at a rate substantially greater than the pulse frequency of said sensor means and the frequency of said sample pulses, a first AND gate connected to receive said sample pulses and said sensor pulses to enable said sensor pulses during the period of said sample pulses, pulse-generating means receiving said sensor pulses from said first AND gate producing narrow marker pulses whenever the leading edge or the trailing edge of said sensor pulses occurs within the period of a sample pulse, a second AND gate connected to receive said sample pulses and said clock pulses and conducting said clock pulses during the period said sample pulses are present, first counter means having reset means connected to receive said marker pulses and receiving said clock pulses from said second AND gate such that said first counter means is reset with each marker pulse and said first counter means counts said clock pulses during the period of said sample pulse subsequent to receipt of the last of said marker pulses, a third AND gate connected to receive said narrow marker pulses and said clock pulses to enable clock pulses during the period of said sample pulse subsequent to receipt of said first marker pulse and a second counter connected to count said clock pulses from said third AND gate, a third counter connected to count said marker pulses, and means connecting the counts of said first, second and third counters to said microprocessor at the end of each sample period.

2. A signal-generating means for computing wheel speed for a skid control system as claimed in claim 1 wherein said sample period is programmed into said microprocessor according to:

Sample period = 2/v × n where v = the lower limit of tire speed for which skid control is required in radians/sec.

and n = the number of pulses per revolution of the speed sensor.

3. A signal-generating means for computing wheel spaced for a skid control system as claimed in claim 1 wherein said microprocessor uses the counts of said counters to compute tire speed by:

Tire velocity =

$$\left(\frac{\text{counts of second counter} - \text{counts of first counter}}{\text{counts of third counter} - 1}\right)^{-1} \times K$$

where K =

$$\frac{\text{radians/sensor pulse}}{2 \times \text{high rate clock pulse period}}$$

4. A signal-generating means for computing wheel speed for a skid control system as claimed in claim 2 wherein said microprocessor uses the counts of said counters to compute tire speed by:

Tire velocity =

$$\left(\frac{\text{counts of second counter} - \text{counts of first counter}}{\text{counts of third counter} - 1}\right)^{-1} \times K$$

where K =

$$\frac{\text{radians/sensor pulse}}{2 \times \text{high rate clock pulse period}}$$

5. For use with a skid control system including a microprocessor, means producing electrical signals for computation of instantaneous wheel speed comprising
generating means driven by said wheel for producing an alternating voltage whose frequency varies with rotational speed of said wheel and signal-processing means converting said signal to a series of sensor pulses whose frequency varies with said rotational speed,
a digital clock producing high speed pulses,
means in said microprocessor producing a uniform sample pulse,
pulse-generating means receiving said sensor pulses and producing a series of sharp marker pulses at twice the frequency of said sensor pulses,
first, second and third counters connected to supply counts to said microprocessor at the end of each sample pulse,
said first counter connected to receive said clock input during a sample pulse including reset means connected to receive said marker pulses such that said first counter counts clock pulses only during the period between the occurrence of the last marker pulse in the sample period and the end of the sample period,
said second counter being connected to receive said marker pulses and said clock pulses and gated to count said clock pulses during said sample period subsequent to receipt of said first marker pulse in said sample period, and
said third counter connected to count said marker pulses.

6. A signal-generating means for computing wheel speed for a skid control system as claimed in claim 5 wherein said microprocessor uses the counts of said counters to compute tire speed by:

Tire velocity =

$$\left( \frac{\text{counts of second counter} - \text{counts of first counter}}{\text{counts of third counter} - 1} \right)^{-1} \times K$$

where $K =$ $$\frac{\text{radians/sensor pulse}}{2 \times \text{high rate clock pulse period}}.$$

* * * * *